United States Patent Office 2,786,084
Patented Mar. 19, 1957

2,786,084

PRODUCTION OF DICHLORODIPHENYLTRI-CHLORETHANE

Frank J. Hendel, Arcadia, Calif., assignor to Wigton-Abbott Corporation, Plainfield, N. J., a corporation of New Jersey No Drawing. Application July 15, 1955,
Serial No. 522,367

1 Claim. (Cl. 260—649)

This invention relates to a process for preparing dichlorodiphenyltrichlorethane, hereinafter referred to as DDT, and more particularly to an improved procedure for preparing DDT in a finely divided and friable form. This is a continuation-in-part of application Serial No. 289,210, filed May 21, 1952, and now abandoned.

The production of DDT has in the past been complicated by the fact that the product generally obtained is of a waxy nature which cannot be readily ground or subdivided. Various procedures have been proposed for overcoming this difficulty, as for example, by controlled cooling of molten DDT, and while such cooling process yields a more or less friable product, it nevertheless yields a product which must be ground in order to produce a uniform finely divided solid.

The production of DDT has been further complicated by the fact that DDT, as commercially prepared, comprises mostly a mixture of two isomeric materials, i. e. 2,2-bis (p-chlorophenyl)-1,1,1-trichlorethane and 2-o-chlorophenyl - 2 - p' - chlorophenyl - 1,1,1-trichlorethane, hereinafter referred to as the p,p' and o,p' isomers. From the standpoint of insecticidal properties, the p,p' DDT is the most effective. In addition, the p,p' DDT has a higher melting point, melting at about 108.5–109.0° C., whereas the o,p' DDT melts at about 74.0–74.5° C. In commercial products, the p,p' isomer and the o,p' isomer are generally present in the proportions of about 70 to 75 percent of the former to about 19 to 21 percent of the latter. If the proportion of the o,p' isomer exceeds the amount specified as frequently occurs, the product has a marked tendency to assume the undesirable waxy characteristic which interferes with grinding and finishing operations.

I have discovered in accordance with the present invention a procedure whereby molten DDT, even if it contains an excessive amount of the undesired o,p' isomer can be converted directly to a finely divided, friable solid product. Regarded in certain of its broader aspects, my novel process comprises mixing together with agitation the molten DDT and a mixture of organic liquid in which both isomers of DDT are fairly readily soluble at a higher temperature, however, below the boiling point of the mixture, but difficultly soluble at lower temperatures, introducing the DDT at such a rate as to maintain a supersaturated condiion whereby molten DDT will go into solution and at the same time finely divided, solid DDT will fall out of solution, separating the solids which thus fall out of solution, and drying the same to remove entrained organic liquid.

The process lends itself either to continuous operation in which a portion of the reaction mixture is constantly removed for separation of the finely divided solid DDT, the separated mixture of organic liquids being recycled and contacted with fresh molten DDT; and to batchwise operation wherein a quantity of organic liquids is combined with molten DDT under vigorous agitation until the desired degree of supersaturation is achieved and the entire mass or reaction mixture is then treated for separation of finely divided solid DDT. The continuous process is particularly advantageous as the finely divided solid DDT can readily be recovered by continuous rotary drum, vacuum filters or continuous centrifugal filters. In each instance, the organic liquids can readily be recycled and the air or other drying medium can be continuously treated for recovery of organic liquid therefrom.

While there are a number of mixtures of organic liquids which have the desired properties of dissolving the two isomers of DDT readily at a higher temperature while dissolving the isomers only with difficulty at lower temperatures, the mixture of organic liquids which I find preferable in the process consists of methyl alcohol and acetone.

In my solvent mixture, the extent to which DDT can be dissolved therein is of primary importance. Thus, for example, methyl alcohol alone without admixture of acetone does not provide a suitable solvent as the solubility of DDT in methyl alcohol is practically nil even at the boiling point of methyl alcohol. If methyl alcohol were used alone in my process, suspended particles of molten DDT would, instead of going into solution, become surfused or super-cooled and inwardly would form gummy or taffy-like masses quite unlike the friable dry produc' which my process is adapted to produce. By the addition of about 15 percent acetone, the solubility of DDT in the methanol acetone mixture is increased sufficiently so that DDT will go into solution from the molten state and be thrown out as a finely divided solid from the resulting supersaturated solution.

The mechanism of my process may be explained as follows:

During the rapid and intimate contacting of the solvent with molten DDT, both isomers p,p' and o,p' go into solution until the solvent gets saturated at a given temperature. Further admixing of molten DDT still does not result in throwing the solids out of solvent; this is due to the supercooling effect of the saturated solution. After reaching a certain point of supersaturation, DDT starts falling out in fine crystalline or amorphous form. This metastable condition of the supersaturated DDT solutions is so persistent that although solids of DDT start to fall out of the solution, fresh molten DDT is at the same time going into solution to maintain a supersaturated condition. In this connection, it should be noted that the phenomenon of additional DDT going into solution to maintain the supersaturated condition is peculiar to molten DDT. The solid DDT, once separated from the supersaturated condition, does not go back into solution under the prevailing conditions.

The molten DDT and solvent are combined under conditions such that the resulting mixture is maintained preferably at a temperature between 0° C. and 50° C. In this way, a product of high setting point is obtained, or in other words, a product having a maximum portion of the p,p' isomer of DDT. As the temperature and reaction mixture is lowered below 50° C., a product of progressively lower setting point is obtained. Thus, by controlling the temperature of the reaction mixture, it is possible to control the extent to which the preferred p,p' isomer of DDT is concentrated in the recovered solid, and the o,p' isomer is removed in the separated solvent. When an appreciable amount of o,p' isomer is thus being separated in the solvent, it is possible to remove this isomer at least partially from the solvent before recycling, as for example by cooling the solvent to a lower temperature at which the o,p' is thrown out as solid material.

It is of primary importance both for facilitating rapid solution of molten DDT and for producing a finely divided product as it separates from the supersaturated solution, that thorough agitation of the molten DDT and solvent be provided as they are brought together. This agitation can be effected either by means of a rotary mixer or by passing the mixture through a series of baffles or orifices to provide turbulence in the mixture.

The finely divided, solid DDT prepared by my process will vary in bulk density depending upon the amount of moisture present in the molten DDT and remaining in the product. When the molten DDT is substantially anhydrous, a more or less fluffy product of low bulk density is obtained. As the amount of moisture in the molten DDT is increased up to about 0.5 percent, a product of progressively higher bulk density is obtained. It will be apparent that this practical way of controlling bulk density is an important factor in producing DDT to meet predetermined specifications.

The following example will serve to show a typical procedure for preparing finely divided, solid DDT in accordance with my invention, but it is to be understood that the example is given by way of illustration and not of limitation.

Example 1

A solvent mixture was employed in which methyl alcohol and acetone were present in the proportions of 100 to 15 parts by volume. After each consecutive batch the solvent was successively re-used. The molten DDT that was used had a setting point of 90.0° C.

Each batch was started by placing the solvent in a glass bottle provided with a stirrer and cooled from outside by a water bath of 15° C. To approximately 450 grams of the solvent molten DDT was slowly poured in under a vigorous agitation. The temperature of the mixture was maintained at 18° C.–25° C. The mixture was then poured into a centrifuge of five-inch diameter, revolving at 2700 R. P. M. After the pouring into the centrifuge was completed, the centrifuging was continued for ten minutes. At the end of this centrifuging the product contained about seven to nine percent of the solvent. This residual solvent was removed by air-drying before determination of setting point and bulk density of the product.

The solvent (mother-liquor) from the centrifuge was collected and re-used in the successive batch. As and when necessary, make-up solvent was added to maintain the desired volume of solvent and it should be noted that in the successive cycles no effort was made to be certain that the entire reaction mixture was transferred in each instance to the centrifuge. Thus, a small amount of the reaction mixture remained in the reaction vessel from one batch to the other.

The following is a tabulation of results obtained in the treatment of eight successive quantities of DDT after equilibrium conditions had been reached, i. e., after the solvent had become saturated with respect to the p,p' and o,p' isomers. In each case, solvent was recycled and make-up solvent was added as indicated:

| | Solvent in— | | DDT in g. | Total in g. | DDT Wet Out, g. | Solvent Out, g. | Total Out, g. | Mech. and Evap. Loss, g. | S. P., °C. | Bulk Density, lbs./Cu. Ft. |
|---|---|---|---|---|---|---|---|---|---|---|
| | Filtrate, g. | Make-Up, g. | | | | | | | | |
| 1 | 450 | | 150 | 600 | 136 | 475 | 611 | +11 | 92.1 | 19.3 |
| 2 | 475 | | 150 | 625 | 131 | 480 | 611 | −14 | 94.0 | 21.8 |
| 3 | 480 | | 150 | 630 | 156 | 470 | 626 | −4 | 93.4 | 29.3 |
| 4 | 470 | | 150 | 620 | 169 | 436 | 605 | −15 | 90.3 | 27.4 |
| 5 | 436 | 14 | 150 | 600 | 155 | 427 | 582 | −18 | 90.2 | 32.4 |
| 6 | 427 | 23 | 150 | 600 | 153 | 430 | 583 | −17 | 92.9 | 23.0 |
| 7 | 430 | 20 | 150 | 600 | 180.5 | 415 | 595.5 | −4.5 | 91.1 | 34.3 |
| 8 | 415 | 35 | 150 | 600 | 157 | 437 | 594 | −6 | 93.4 | 25.5 |

The results in the foregoing tabulation indicate a general improvement in the setting point, due in part to the removal of traces of chlorobenzene present in the starting DDT. The variation bulk density indicates a variation in the moisture content of the successive charges of DDT. By proper control of the moisture content of the molten DDT at a definite amount, preferably below about 0.5 percent, substantially uniform bulk density can be obtained in successive batches.

When operating the process as a continuous process, a practical way of controlling the temperature is to suitably cool the organic liquid being recycled so that as it is combined with the molten DDT in the desired proportions, the resulting mixture will have the temperature desired in the mixing chamber.

Various changes and modifications in the procedures herein disclosed will occur to those skilled in the art and to the extent that such changes and modifications fall within the purview of the appended claim, it is to be understood that they constitute part of my invention.

I claim:

The process for improving the quality of commercial DDT, which initially contains a quantity of isomers other than the desired p,p' isomer of DDT, that comprises mixing together with agitation molten DDT and an organic liquid consisting of methanol containing about 15% of its volume of acetone, until a supersaturated solution of DDT in the liquid is obtained, and continuing to add molten DDT with agitation to thereby effect a simultaneous dissolution of additional molten DDT in the supersaturated mixture while maintaining a temperature of the mixture between 0° C. and 50° C. and a separation of finely divided solid DDT therefrom, and removing the finely divided solid DDT from the supersaturated mixture and drying the same to thereby obtain a DDT product having an enhanced setting point due to the increased proportion of p,p' isomer therein.

References Cited in the file of this patent

Mosher et al.: "Industrial and Engineering Chemistry," vol. 38, page 922 (1946).